(12) United States Patent
Nagata

(10) Patent No.: US 6,632,137 B1
(45) Date of Patent: *Oct. 14, 2003

(54) TARGET-GAME EXECUTION METHOD, GAME MACHINE, AND RECORDING MEDIUM

(75) Inventor: Akihiko Nagata, Tokyo (JP)

(73) Assignee: Konami Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/589,837

(22) Filed: Jun. 8, 2000

(30) Foreign Application Priority Data

Jun. 11, 1999 (JP) ............................................ 11-166115

(51) Int. Cl.⁷ ................................................ A63F 13/00
(52) U.S. Cl. ............................................ 463/5; 463/36
(58) Field of Search ........................... 463/40, 50, 53, 463/56, 43, 1–4, 5, 23, 49, 30–32, 36; 273/317.6, 348, 371

(56) References Cited

U.S. PATENT DOCUMENTS

| | | | | |
|---|---|---|---|---|
| 4,008,893 A | * | 2/1977 | Yoseloff | 463/2 |
| 4,099,719 A | * | 7/1978 | Dean et al. | 235/411 |
| 4,195,838 A | * | 4/1980 | Santandrea et al. | 273/88 |
| 4,240,632 A | * | 12/1980 | Watanabe | 273/88 |
| 4,324,402 A | * | 4/1982 | Klose | 273/88 |
| 4,372,557 A | * | 2/1983 | Del Principe et al. | 273/88 |
| 4,381,864 A | * | 5/1983 | Bromley et al. | 273/88 |
| 4,969,647 A | | 11/1990 | Mical et al. | |
| 5,120,057 A | | 6/1992 | Kitaue | |
| 5,137,277 A | * | 8/1992 | Kitaue | 273/85 G |
| 5,190,286 A | | 3/1993 | Watanabe et al. | 273/856 |
| 5,419,549 A | * | 5/1995 | Galloway et al. | 473/455 |
| 5,435,554 A | * | 7/1995 | Lipson | 463/3 |
| 5,478,077 A | * | 12/1995 | Miyahara | 273/185 R |
| 5,599,017 A | * | 2/1997 | Bixler et al. | 473/436 |
| 5,601,487 A | * | 2/1997 | Oshima et al. | 463/4 |
| 5,795,224 A | * | 8/1998 | Yoshida | 463/2 |
| 6,325,715 B1 | * | 12/2001 | Nagata | 463/36 |

FOREIGN PATENT DOCUMENTS

| | | |
|---|---|---|
| CN | 221107 | 10/1990 |
| DE | 29710637 | 9/1997 |
| DE | 29713965 | 10/1997 |

OTHER PUBLICATIONS

Links 386CD Players Manual, 1995, Access Software, Inc., pp. 32–33.*
Tiger Electronics, LTD. TM, Model 66–002 Instruction Manual, 1998, Tigertoys.com, p. 1–3.*
Tiger Electronics, LTD. TM, Baseball Model 75–014 Mini Tiger Games TM Advertisement, 1997, p. 1.*
Tiger Electronics, LTD. TM, Baseball Model 7–41 Mini Tiger Games TM Adverstisement, 1998, p. 1.*
Patent Abstracts of Japan Publication No. 11–08500, entitled Portable Electronic Apparatus Device, By Akihiro Yokoi, issued Mar. 30, 1999.

* cited by examiner

*Primary Examiner*—Michael O'Neill
*Assistant Examiner*—Scott E. Jones
(74) *Attorney, Agent, or Firm*—Bachman & LaPointe, P.C.

(57) ABSTRACT

A portable game machine electronically executes target games and has an input unit, a game processing unit, and a display unit in a housing. A plurality of targets to be hit are displayed on the display unit. First pitching data concerning the vertical displacement of a ball and second pitching data concerning the horizontal displacement of a ball are successively input by a game player through operation keys provided for the input unit. By using the information of the first pitching data and the second pitching data, the game processing unit determines whether the ball has hit one of the targets. Based on the determination result, an image of the target after the ball has been thrown is displayed on the display unit.

40 Claims, 8 Drawing Sheets

| GAUGE | LV1 | LV2 | LV3 |
|---|---|---|---|
| 0~1 | −3 | −4 | −4 |
| 2~3 | −2 | −3 | −4 |
| 4 | −1 | −2 | −3 |
| 5 | ±0 | −1 | −2 |
| 6~7 | +0 | ±0 | −1 |
| 8~9 | +1 | +1 | ±0 |
| 10 | +1 | +1 | +1 |

FIG. 8

| GAUGE | LV1 | LV2 | LV3 |
|---|---|---|---|
| 6 OR LESS | 0 | 0 | 0 |
| 7 | 3/8 | 3/8 | 0 |
| 8 | 5/8 | 4/8 | 2/8 |
| 9 | 7/8 | 6/8 | 4/8 |
| 10 | 8/8 | 8/8 | 8/8 |
| 11 | 8/8 | 8/8 | 8/8 |

FIG. 9

| GAUGE | LV1 | LV2 | LV3 |
|---|---|---|---|
| 6 OR LESS | 0 | 0 | 0 |
| 7 | 5/8 | 5/8 | 0 |
| 8 | 3/8 | 4/8 | 6/8 |
| 9 | 1/8 | 2/8 | 4/8 |
| 10 OR MORE | 0 | 0 | 0 |

FIG. 10

TARGET-GAME EXECUTION METHOD, GAME MACHINE, AND RECORDING MEDIUM

BACKGROUND OF THE INVENTION

1. Field of the Invention

The present invention generally relates to computer game techniques and, more particularly, to a computer game technique implementing a target game in which a plurality of targets shown on a display unit are hit with balls.

2. Description of the Related Art

Target games often performed at fairs have been popular for a long time. Games in which targets are aimed at and hit from a distance with a gun or a ball (target games) require high concentration and thus highly stimulate people, thereby engaging players in the game. Generally, in this type of game, targets are set at a distance and are hit by shooting or throwing a ball. In particular, target games which require players to throw a ball to hit targets are highly entertaining.

With the recent progress of technology, many kinds of game machines utilizing electronic circuits have been proposed. These types of game machines are usually formed of an input unit operated by game players, a game processing unit for executing game processing in response to an operation input through the input unit, and a display unit presenting the executed result of the game processing unit to the game players.

Among the above types of machines, some machines are portable in which the input unit, the game processing unit, and the display unit are stored In a portable housing. There is an Increasing demand for developing attractive games for use in the portable game machines, as well as in the other types of game machines. However, a higher restriction on the hardware, including a storage unit, is imposed on the portable game machines than on the other types of game machines, which makes it difficult to develop highly entertaining and attractive games.

Under these circumstances, although the target games, which are highly entertaining, are very attractive games, a specific method for performing the target games on game machines is not known.

SUMMARY OF THE INVENTION

Accordingly, In view of the above background, it is an object of the present invention to provide a target-game execution method for executing a target game on a game machine, a game machine formed of a computer for executing the target game, and a recording medium for implementing the target-game execution method on a computer.

In order to achieve the above object, according to one aspect of the present invention, there is provided a target-game execution method for use in a portable game machine. The portable game machine includes an input unit operated by a game player, a game processing unit for executing game processing based on an operation input from the input unit, and a display unit for providing an execution result executed by the game processing unit to the game player. The game target-game execution method includes the steps of: displaying a plurality of targets on the display unit; determining by the game processing unit by using first pitching data and second pitching data successively input by the game player through the input unit whether a ball has hit one of the plurality of targets, one of the first pitching data and the second pitching data being used as information concerning a vertical displacement of the ball from an aimed target, and the other data being used as information concerning a horizontal displacement of the ball from the aimed target; and displaying a resulting image of the target on the display unit after the ball has been thrown based on a determination result obtained by the game processing unit.

That is, in this target-game execution method, the displacement of a ball from an aimed target can be determined only by inputting the first pitching data and the second pitching data successively input by the game player, thereby implementing the game without performing complex processing. The term "pitching" in this specification includes all kinds of action using balls, such as throwing a ball, kicking a ball, hitting a ball, flying a ball to a target, etc.

In addition to the first pitching data and the second pitching data to make the above determination, the following processing may be executed. Pitch-correcting data input by the game player through the input unit for correcting at least one of the first pitching data and the second pitching data may be received, and based on at least one of the first pitching data and the second pitching data corrected with the pitch-correcting data, the game processing unit may determine whether the ball has hit one of the plurality of targets.

The pitch-correcting data is used for weighting the first pitching data and the second pitching data. By using the weighted data, the displacement of a ball can be varied, thereby enhancing the entertaining characteristics of the game.

The configuration and the number of targets are not particularly restricted as long as a plurality of targets are displayed on the display unit, and the targets may be sequentially located in a matrix form.

In the aforementioned target-game execution method, when the ball has been displaced from the aimed target in one of the vertical direction and the horizontal direction and when there is a remaining target which has not been hit at a position to which the ball has been displaced, the game processing unit may determine that the ball has hit the remaining target. With this arrangement, even when the ball has not hit the aimed target, another target located at a position to which the ball has been displaced can be hit. This arises from luck and is fortunate for the player. Such an unexpected happening can make the game more entertaining.

Even when the ball has displaced from the aimed target in the vertical or horizontal direction and there is a remaining target at a position to which the ball has been displaced, it does not have to determine that the ball has hit the remaining target. It may be determined that the ball has hit the remaining target with a certain probability, or only when the first pitching data and the second pitching data satisfy certain conditions.

Alternatively, when the ball has been displaced from the aimed target in one of the vertical direction and the horizontal direction and when there is a target which has not been hit adjacent to the aimed target in the direction to which the ball has been displaced, the game processing unit may determine that the ball has hit some of the plurality of targets located in the direction to which the ball has been displaced. In this case, it is possible to hit two to four targets by pitching the ball only once, thereby increasing the degree of luck and enhancing the entertaining characteristics of the game.

In this case, as well as in the previous case, it does not have to determine that the ball has hit some of the plurality of targets located in the direction to which the ball has been displaced, and it may be set that the ball has hit some of the plurality of the targets with a certain probability, or only when the first pitching data and the second pitching data satisfy certain conditions.

The first pitching data, the second pitching data, and the pitch-correcting data generally indicate the timing at which the player operates the input unit, though they may vary according to the type of input unit. In this case, the target-game execution method may further include the steps of: locating a gauge, which is formed by continuously arranging a plurality of small regions in a predetermined direction, at a predetermined position of the display unit; and displaying timing information on the gauge as a guide for the game player for inputting the first pitching data, the second pitching data, and the pitch-correcting data.

The target-game execution method may further include the steps of: determining by the game processing unit that the game is a success when all the targets have been hit within a predetermined limited number of balls, and determining that the game is a failure when all the targets have not been hit within the predetermined limited number of balls; and displaying an Image of the success of the game on the display unit when the game is found to be a success. Thus, the main purpose of this game is whether all the targets can be hit within a determined number of balls, and the corresponding image is displayed on the display unit. This increases the feeling of achievement when the game has resulted in success, thereby making the game more entertaining. In this method, an image of the failure of the game, as well as the image of the success, is displayed on the display unit when the game processing unit determines that the game is a failure.

According to another aspect of the present invention, there is provided a game machine including: an input unit operated by a game player; a game processing unit for executing game processing based on an operation input from the input unit; and a display unit for providing an execution result executed by the game processing unit to the game player. The game processing unit displays a plurality of targets on the display unit and determines by using first pitching data and second pitching data successively input by the game player through the input unit whether a ball has hit one of the plurality of targets, one of the first pitching data and the second pitching data being used as information concerning a vertical displacement of the ball from an aimed target, and the other data being used as information concerning a horizontal displacement of the ball from the aimed target. The game processing unit displays a resulting image of the target on the display unit after the ball has been thrown based on a determination result obtained by the game processing unit.

The game processing unit of this game machine may be provided with the functions of the game executing method.

In the above-described game machine, the input unit, the game processing unit, and the display unit are contained in a portable housing. This makes the game machine portable and handy so as to enable game players to play this game anywhere and anytime, and in combination with the pitching game, the game becomes more entertaining.

The aforementioned target-game execution method can be implemented by reading program code recorded in a recording medium by a computer including a predetermined display unit and an input unit operated by a game player.

Thus, according to a further aspect of the present invention, there is provided a computer-readable recording medium in which program code for operating a computer as a game machine is recorded. The program code causes the computer to execute the steps of: displaying a plurality of targets on the display unit; determining by using first pitching data and second pitching data successively input by the game player through the input unit whether a ball has hit one of the plurality of targets, one of the first pitching data and the second pitching data being used as information concerning a vertical displacement of the ball from an aimed target, and the other data being used as information concerning a horizontal displacement of the ball from the aimed target; and displaying a resulting image of the target on the display unit after the ball has been thrown based on the determination result.

The term "program code" in the specification encompasses the broadest concept of code, such as data required for causing a game machine to execute the target game, control parameters, etc., in addition to the program itself.

BRIEF DESCRIPTION OF THE DRAWINGS

FIG. 8 illustrates the values for determining pitch-correcting data by levels;

FIG. 9 illustrates the probabilities of a ball hitting an aimed target; and

FIG. 10 illustrates the probabilities of a ball hitting an adjacent target.

DESCRIPTION OF THE PREFERRED EMBODIMENTS

Figure 1:
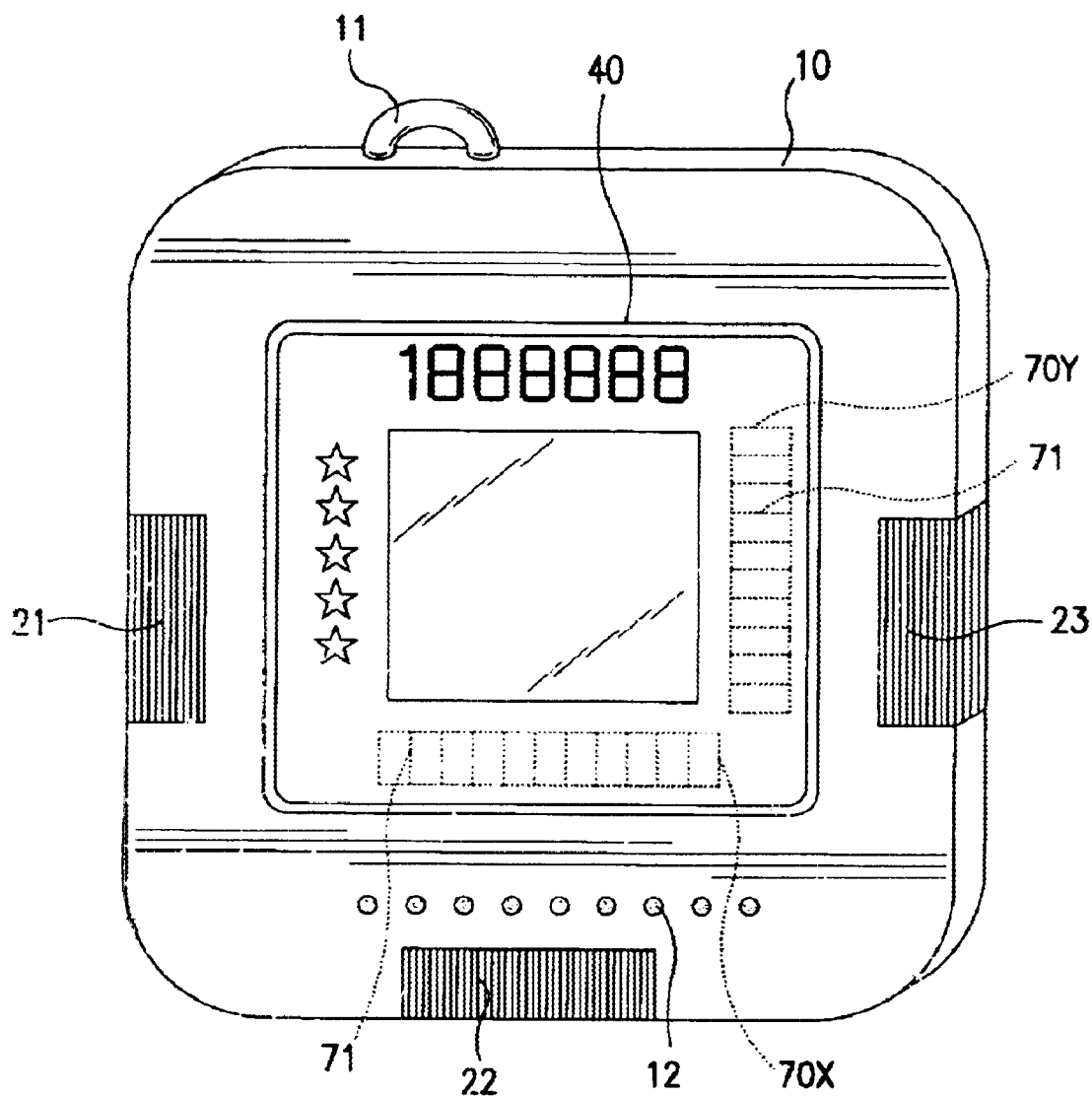
FIG. 1 is a perspective view illustrating the external configuration of a portable game machine according to an embodiment of the present invention.
Figure 2:
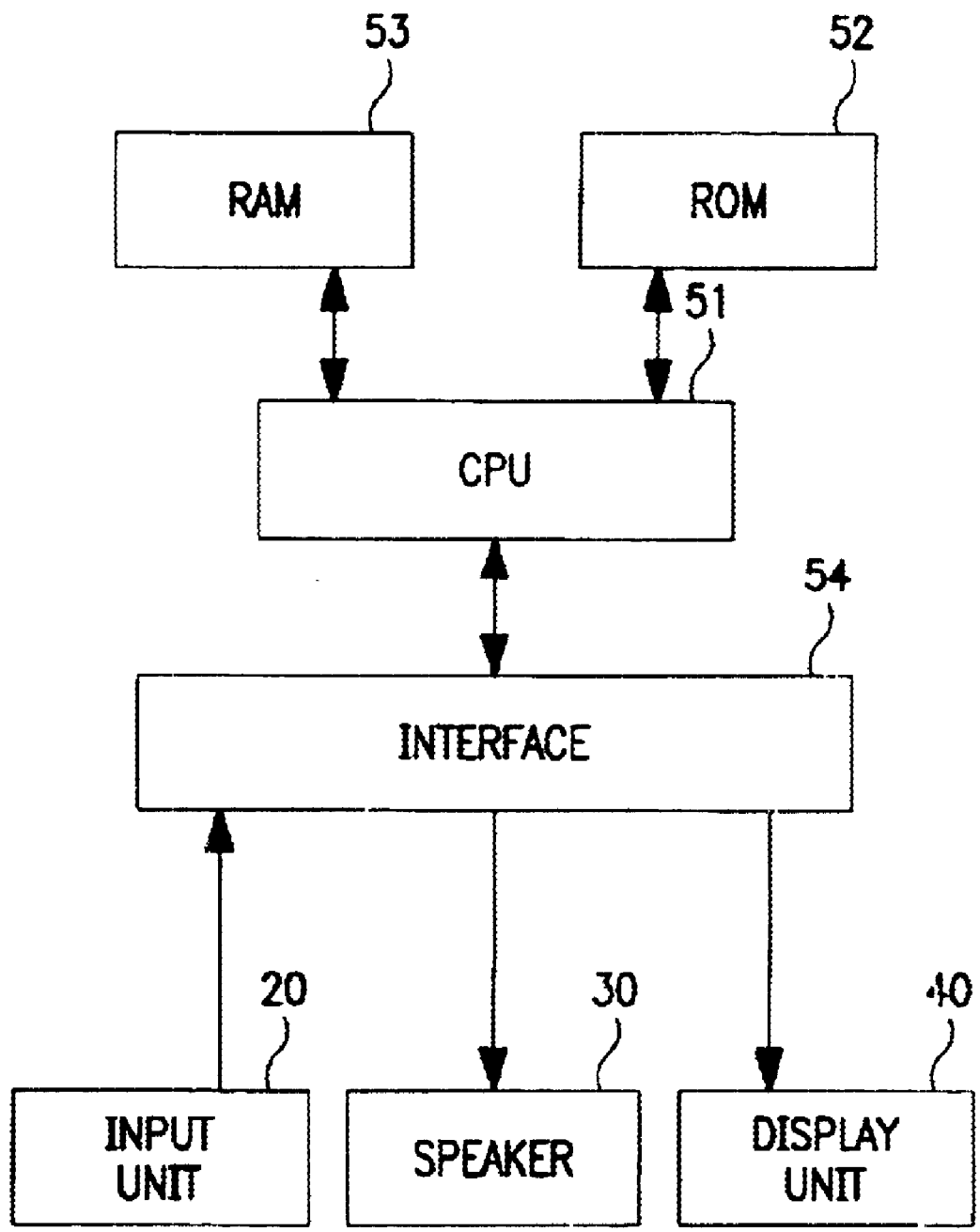
FIG. 2 illustrates the internal configuration of the portable game machine shown in FIG. 1.

The present invention is described in detail below with reference to the accompanying drawings through illustration of preferred embodiments. A description is first given, with reference to FIGS. 1 and 2, of a target-game execution method executed by a portable game machine. More particularly, FIG. 1 illustrates the external appearance of the portable game machine, and FIG. 2 illustrates the internal configuration of the game machine. There are many types of target games, and in this embodiment the target game is discussed in the context of a pitching game.

The portable game machine is formed, as shown in FIGS. 1 and 2, in which an input unit 20, a speaker 30, and a display unit 40 are provided in a housing 10. The housing 10 is formed to be small enough to be held in a hand. At the top of the housing 10, a semi-circular hook 11 for connecting the game machine to, for example, a chain attached to a key holder, is provided.

The input unit 20 is formed of three operation keys 21, 22, and 23 attached to lateral surfaces and the bottom surface of the housing 10. The display unit 40 is, for example, a dot-matrix-type liquid crystal display, and the display surface is formed generally in a rectangular shape. A plurality of speaker holes 12 for outputting sound from the speaker 30 are formed below the display unit 40 at the bottom portion of the housing 10.

Inside the portable game machine, as shown in FIG. 2, a central processing unit (CPU) 51, a read only memory (ROM) 52, a random access memory (RAM) 53, and an interface 54 are disposed. The ROM 52, the RAM 53, and the interface 54 are connected to the CPU 51. The CPU 51 controls the overall portable game machine, and the ROM 52 stores programs for execution by the CPU 51, target game rules, game image data, etc. The RAM 53 serves as a work area for the CPU 51 while executing data processing.

The interface 54 serves as an input/output connecting circuit for the CPU 51. The input unit 20, the speaker 30, and the display unit 40 are connected to the CPU 51 via the interface 54. Accordingly, operation information which is generated in response to the operation performed on the input unit 20 is input into the CPU 51 via the interface 54, and image information to be displayed on the display unit 40 and sound information to be output to the speaker 30, both kinds of information being generated by the CPU 51, are output to the display unit 40 and the speaker 30, respectively, via the interface 54.

Figure 3:
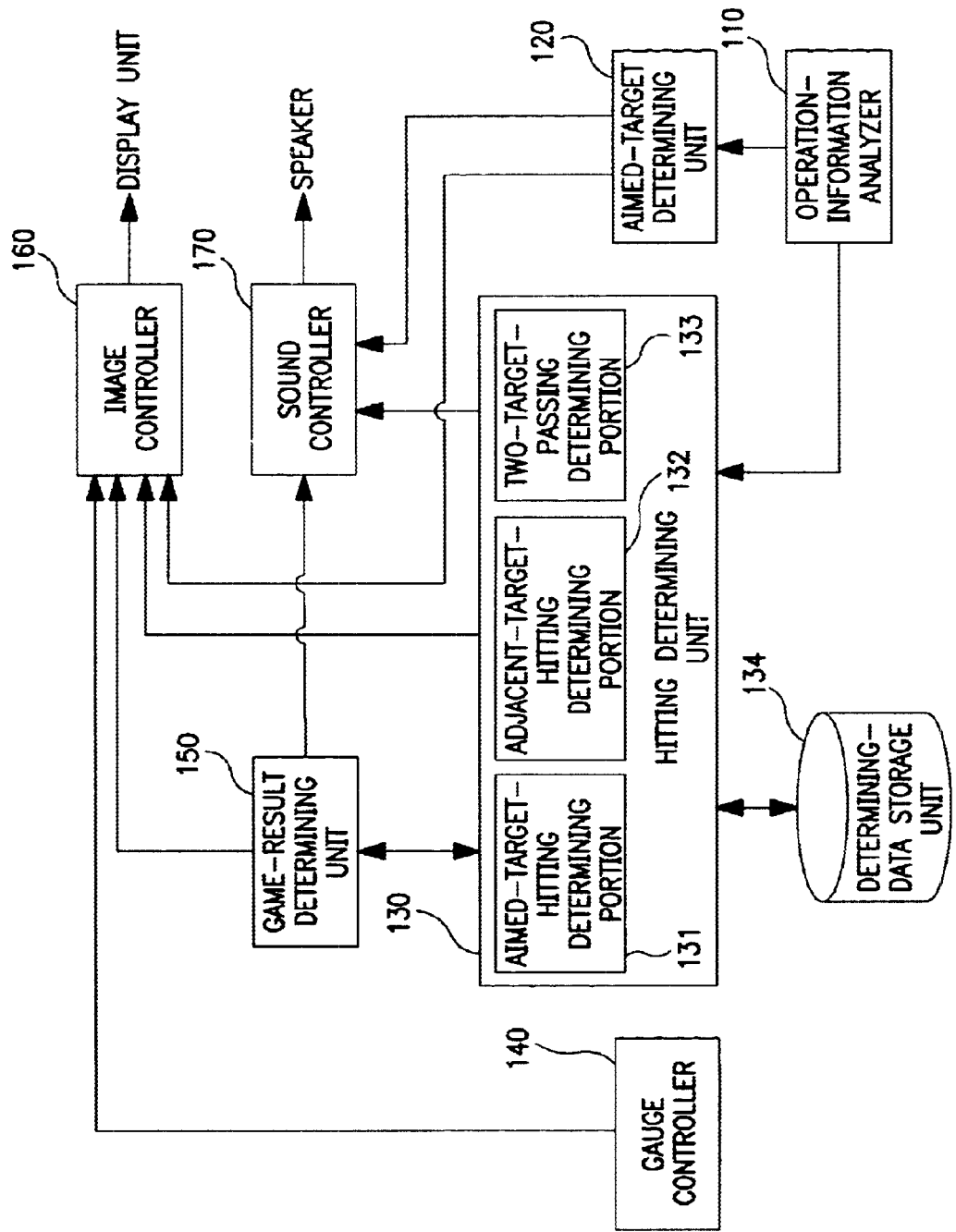
FIG. 3 is a block diagram illustrating the functional blocks generated in the portable game machine shown in FIG. 1.

Upon supplying power, functional blocks, such as the ones shown in FIG. 3, are generated within the portable game machine. That is, an operation-information analyzer 110, an aimed-target determining unit 120, a hitting determining unit 130, a gauge controller 140, a game-result determining unit 150, an image controller 160, and a sound controller 170 are created, thereby forming a game processing unit.

The operation-information analyzer 110 is connected to the input unit 20 via the interface 54 and is also connected to the aimed-target determining unit 120 and the hitting determining unit 130. The operation-information analyzer 110 analyzes the operation Information input from the input unit 20 and transfers it to the aimed-target determining unit 120 and the hitting determining unit 130.

Figure 5:
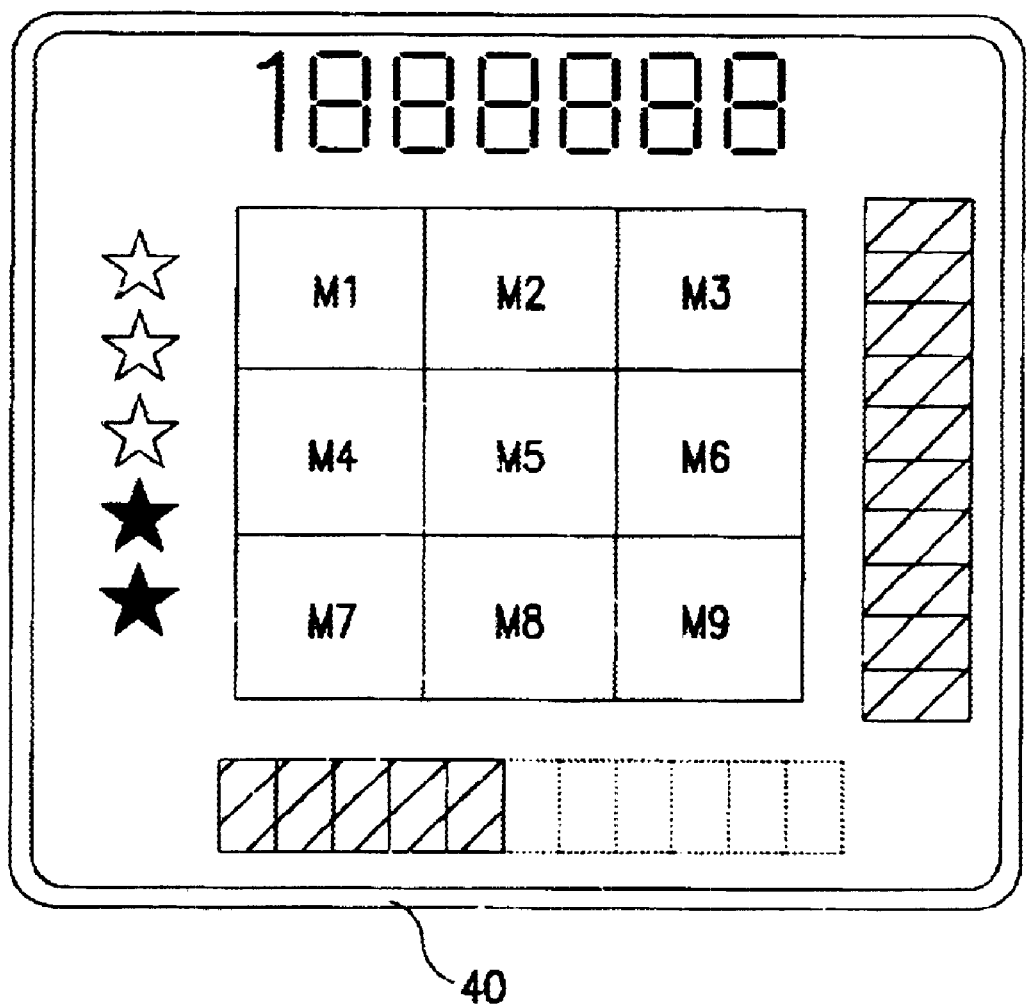
FIG. 5 is a front view illustrating an example of a display unit when a game is executed on the portable game machine shown in FIG. 1.

Based on the information from the operation-information analyzer 110, the aimed-target determining unit 120 determines which target of M1 through M9 (see FIG. 5) is aimed at by a game player, and sends the corresponding information to the image controller 160 and the sound controller 170.

The hitting determining unit 130 determines, based on the information from the operation-information analyzer 110, whether a ball thrown by the player has hit the target of M1 through M9 determined by the aimed-target determining unit 120. The hitting determining unit 130 includes an aimed-target-hitting determining portion 131, an adjacent-target-hitting determining portion 132, and a two-target-hitting determining portion 133. The aimed-target-hitting determining portion 131 determines whether a ball thrown by the player has hit the aimed target of M1 through M9. If the ball has not hit the aimed target of M1 through M9, the adjacent-target-hitting determining portion 132 determines whether the ball has hit a target adjacent to the aimed target. If not, the two-target-hitting determining portion 133 determines whether the ball has hit two targets, such as the aimed target and an adjacent target of M1 through M9. The determination results are then sent to the game-result determining unit 150, the image controller 160, and the sound controller 170 connected to the hitting determining unit 130.

In making the determinations, the hitting determining unit 130 utilizes parameters stored in a determining-data storage unit 134 connected to the hitting determining unit 130.

The game-result determining unit 150 compares the number of preset balls, the number of balls thrown by the player, and the number of targets M1 through M9 hit by the player, and then determines the success or the failure of the game.

More specifically, when all the targets M1 through M9 have been hit, the game-result determining unit 150 determines that the game is a success. When the number of remaining balls is below the number of targets M1 through M9 left, the game-result determining unit 150 determines that the game is a failure. Otherwise, the game-result determining unit 150 determines that the player should continue the game. The game result determined by the game-result determining unit 150 is sent to the image controller 160 and the sound controller 170.

The gauge controller 140 controls the display of gauges 70X and 70Y used for presenting information as a guide for the player for operating the input unit 20. The gauge controller 140 Is connected to the image controller 160 and sends information required for displaying the gauges 70X and 70Y on the display unit 40 to the image controller 160.

As stated above, both the image controller 160 and the sound controller 170 are connected to the aimed-target determining unit 120, the hitting determining unit 130, the gauge controller 140, and the game-result determining unit 150, and receive data concerning the progress of the game from the above-described elements. The image controller 160 displays the states of the targets M1 through M9 and the pitching motion on the display unit 40 according to the input information, and the sound controller 170 outputs a corresponding sound.

The target game of the present invention is executed by the above-constructed portable game machine by the following process.

Figure 4:
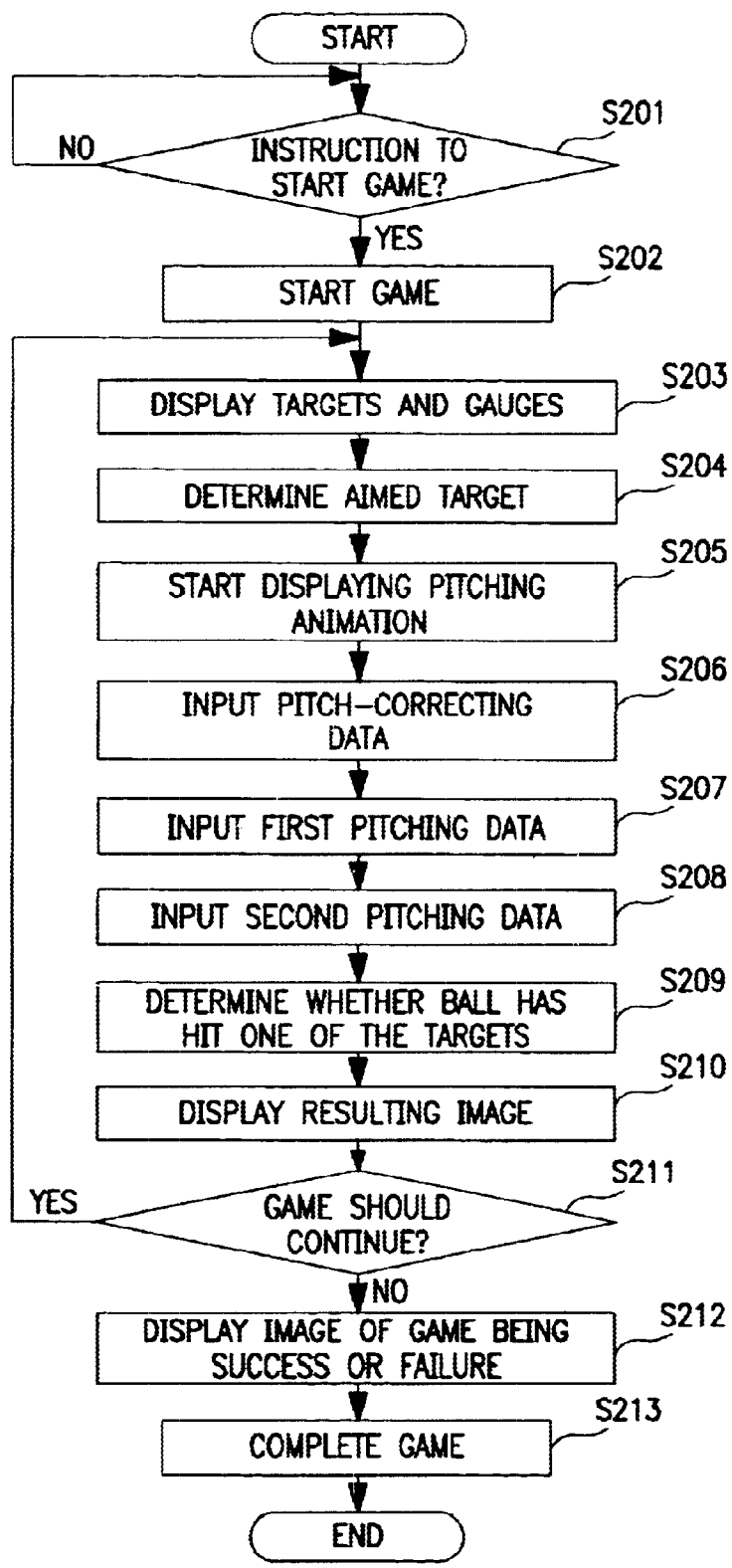
FIG. 4 is a flow chart illustrating the progress of a game executed on the portable game machine shown in FIG. 1.

FIG. 4 illustrates the overall process of the target-game execution method. At the start of the game, the game title and the demonstration screen are displayed on the display unit 40. Upon inputting an instruction to start the game from the input unit 20 in step S201, the game is started in step S202. More specifically, if any one of the operation keys 21, 22, and 23 is operated, it is determined that an instruction to start the game has been provided.

After starting the game, in step S203, not only the score and the game level, but also a 3×3-matrix of the targets M1 through M9 and the gauges 70X and 70Y, are displayed on the display unit 40. The gauge 70X is formed by continuously and linearly arranging eleven small regions 71, and the gauge 70Y is formed by continuously and linearly arranging ten small regions 71. The gauges 70X and 70Y are displayed along two adjacent sides of the display unit 40. One dot forming the dot-matrix-type liquid crystal display 40 is assigned to each region 71 (see FIG. 5).

Subsequently, in step S204, the target of M1 to M9 to be aimed at is determined. Numbers 1 through 9 are assigned to the targets M1 through M9, respectively, from the top left to the bottom right.

The selection of the aimed target of M1 through M9 is performed as follows. In this embodiment, by operating the operation key 21 disposed at the left side of the housing 10, the aimed target is changed by decreasing the number, and by operating the operation key 23 disposed at the right side of the housing 10, the aimed target is changed by increasing the number. With this arrangement, the player is able to select the aimed target of M1 through M9 by operating the operation keys 21 and 23. The aimed target is displayed by inverting the color of the other targets so that it can be distinguished from the other targets. The operation key 22 disposed at the bottom portion of the housing 10 is used as a setting key. Thus, by pressing the operation key 22 after selecting the aimed target of M1 to M9, the player is able to set the aimed target.

Figure 6A:
FIGS. 6A through 6E illustrate animation indicating the pitching operation shown on the display unit shown in FIG. 1.
Figure 6B:
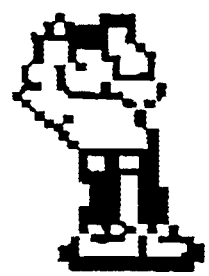
Figure 6C:
Figure 6D:
Figure 6E:
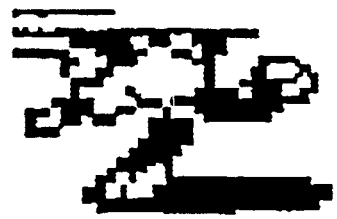

When the aimed target is set, in step S205, a pitcher character appears on the display unit 40, and animation of pitching motions, such as the ones shown in FIGS. 6A through 6E, is displayed. When more detailed animation, such as the pitching motions shown in FIGS. 6A, 6B, and 6C, are displayed, timing information for suggesting the timing at which pitch-correcting data, first pitching data, and second pitching data (discussed below) are input, to the player is presented on the gauge 70Y.

Figure 7:
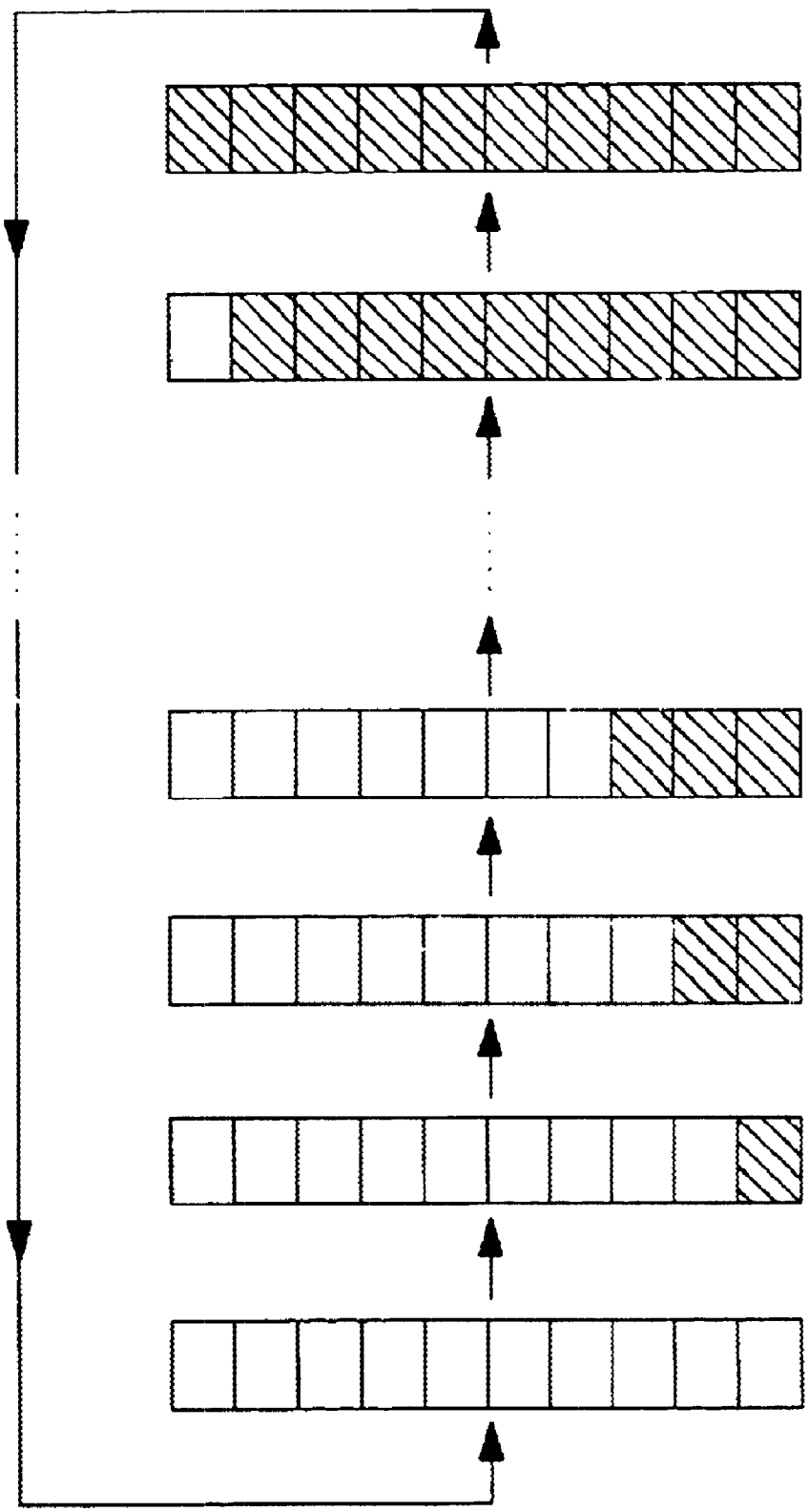
FIG. 7 illustrates an information providing method by using gauges.

This timing information can be provided by sequentially displaying the small regions 71 of the gauge 70Y, as shown in FIG. 7. More specifically, all the small regions 71 within the gauge 70Y are first displayed in white, and are then sequentially inverted into black from the bottommost region 71. When all the regions 71 have been inverted into black, they are inverted into white. By repeating this display operation, the timing information is provided. The parameters are set in such a manner that the displacement of the ball is less when a greater number of black regions 71 are displayed. Accordingly, the player is able to easily determine the timing for operating the input unit 20 by checking the gauge 70Y.

When the pitching animation shown in FIG. 6A is displayed, in step S206, the pitch-correcting data is set by the player operating one of the operation keys 21, 22, and 23. The pitch-correcting data is set to the value indicated in the table shown in FIG. 8 based on the number of black regions 71 (indicated by the gauge in FIG. 8) when the operation key 21, 22, or 23 is operated. For example, when the level of difficulty of the target game is 1 (hereinafter referred to as "LV1", and the same applies to LV2 and LV3) and when the number of black regions 71 is 4 and 10, the pitch-correcting data is determined to be −1 and +1, respectively.

When the pitching animation is changed into the state shown in FIG. 6B, in step S207, the first pitching data is set by operating one of the operation keys 21, 22, and 23 by the player. The number of black regions 71 when the player operates the operation key 21, 22, or 23 is set as the first pitching data, and the first pitching data determines the horizontal displacement of the ball.

Then, when the pitching animation is changed into the state shown in FIG. 6C, in step S208, the second pitching data is set by the player operating one of the operation keys 21, 22, and 23. The number of black regions 71 when the player operates the operation key 21, 22, or 23 is set as the second pitching data, and the second pitching data determines the vertical displacement of the ball.

In this embodiment, a time limit allowed for inputting the pitch-correcting data, the first pitching data, and the second pitching data is preset. This time limit can be suitably set in accordance with the level of the game, and in this embodiment set to be 30 seconds. Thus, the player is required to input all items of data, such as the pitch-correcting data, the first pitching data, and the second pitching data, within the time limit. If there is no input by the player within the time limit, the pitch-correcting data, the first pitching data, and the second pitching data are determined according to the number of small regions 71 when the time limit elapses.

The remaining time is displayed on the gauge 70X. That is, all the small regions 71 within the gauge 70X are first displayed in black, and the regions 71 are sequentially inverted into white from the leftmost region 71. After the lapse of 30 seconds, all the regions 71 are inverted into white. By displaying the time limit as described above, the player is able to clearly see the remaining time.

The above-described correcting data is added to each of the first pitching data and the second pitching data. Based on the resulting values, in step S209, the hitting determining unit 130 determines whether the ball has hit one of the targets M1 through M9. That is, the above-described values are used as basic data used for making the determination. The probabilities of the aimed target being hit are set and stored in the determining-data storage unit 134 in advance. The probability values, such as those indicated in the table of FIG. 9, can be set as the probabilities of the target being hit by a ball.

For example, when the pitch-correcting data is +1, and the first pitching data indicating the horizontal displacement and the second pitching data indicating the vertical displacement are 6 and 9, respectively, the first pitching data and the second pitching data are changed to 7 and 10, respectively, after the correction. Thus, according to the probability values shown in FIG. 9, the probability of the target being hit at LV1 is ⅜ in the horizontal direction and is ⅝ in the vertical direction. In this case, the ball is displaced only in the horizontal direction. The probability of the ball being displaced to the left side and at the right side is 50% for each side, and it is randomly determined to which side the ball is displaced. FIG. 9 shows that the probability of the aimed target being hit is higher with a greater number of black regions 71 when the pitch-correcting data, the first pitching data, and the second pitching data are input.

If the ball has missed the aimed target, a determination is made whether the ball has hit a target, other than the aimed target, which has not been hit before. In this embodiment, it is determined whether the ball has hit the targets only adjacent to the aimed target. In this case, the probabilities of the adjacent targets being hit are set and stored in the determining-data storage unit 134 in advance, and may be set to values such as those indicated in the table shown in FIG. 10. For example, when the pitch-correcting data is +1, and the first pitching data and the second pitching data are 6 and 9, respectively, as stated above, the probability of adjacent targets being hit is ⅝ in the horizontal direction. Accordingly, if the ball has not hit the aimed target and if there is an adjacent target to the left or the right which has not been hit before, the ball hits the adjacent target with a probability of ⅝.

In this pitching game, the ball may hit two targets at the same time. The condition for hitting two targets may be set, such as "both the first pitching data and the second pitching data are 6 before they are corrected with the pitch-correcting data", and is set and stored in the determining-data storage unit 134 in advance.

In the aforementioned example, since the first pitching data is 6 and the second pitching data is 9, two targets are not hit at the same time. If the occurrence of hitting two targets is very rare, any one of the adjacent targets M1 through M9 which has not been hit may be hit together with another adjacent target. On the other hand, if the occurrence of hitting two targets is very frequent, restrictions may be imposed in which the occurrence of hitting two targets is zero if the aimed target or the adjacent target is M5. For example, the following conditions may be set. If the aimed target is M1, only the targets M2 and M4 may be simultaneously hit. If the aimed target is M2, only the targets M1 and M3 may be simultaneously hit. If the aimed target is M3, only the targets M2 and M6 may be simultaneously hit. If the aimed target is M4, only the targets M1 and M7 may be simultaneously hit. If the aimed target is M6, only the targets M3 and M9 may be simultaneously hit. If the aimed target is M7, only the targets M4 and M8 may be simultaneously hit. If the aimed target is M8, only the targets M7 and M9 may be simultaneously hit. If the aimed target is M9, only the targets M6 and M8 may be simultaneously hit. If the aimed target is M5, no targets are simultaneously hit.

While the above-described determination is being made in step S209, animation representing the ball being thrown at the target is shown on the display unit 40 in step S210.

In step S210, according to the result determined by the hitting determining unit 130, a corresponding image indicating that the ball has hit one of the targets M1 through M9, the ball has missed the targets M1 through M9, or the ball has hit two targets is displayed. To further enhance the reality of the game and entertaining characteristics, images of hitting the aimed target, an adjacent target, two targets, or no target are preferably shown. If the ball has hit the aimed target or an adjacent target, animation representing the ball hitting the target is displayed. If the ball has hit two targets, animation indicating the ball hitting two adjacent targets is shown. If the ball has hit no target, animation representing the ball missing the targets is displayed.

It is possible to differentiate the score between when the ball has hit the aimed target and when the ball has hit an adjacent target. For example, hitting the adjacent target largely depends on luck, and the corresponding score may be set lower than that obtained by hitting the aimed target.

After the above-described processing, in step S211, the game-result determining unit 150 determines whether the target game has resulted in success or failure, or whether the result of the game cannot be determined yet, in other words, whether the game should continue. More specifically, if all the targets M1 through M9 have been hit, the game is found to be a success. If the number of the remaining targets M1 through M9 exceeds the number of remaining balls, the game is found to be a failure. In the other cases, it is determined that the game should continue. Concerning the number of balls when the game is started, about twelve balls are preferably provided, considering the number of targets M1 through M9 (nine).

In step S212, if it is determined that the game has resulted in success, animation indicating, for example, the pitcher looking happy, or a word, such as "PERFECT", blinking, is displayed, thereby making the player more enthusiastic about the game. On the other hand, if it is determined that the game has resulted in failure, an image showing the pitcher crying, or words, such as "YOU LOST, TRY AGAIN!", may be indicated. In step S213, the game is then completed.

In the foregoing embodiment, only LV1 data is used in determining whether the ball has hit one of the targets M1 through M9. However, before starting the game, the game level may be selected, and the player is able to play the game at a higher level than LV1, for example, LV2 or LV3. At LV2 or LV3, the speed of changing the small regions 71 of the gauges 70X and 70Y may be faster than that at LV1, thereby increasing the difficulty of the target game. This can prevent the player from becoming bored.

In the aforementioned embodiment, the game execution method executed in a portable game machine is described. However, the present invention may be used in general-purpose computers, such as personal computers, or home-use game machines. For example, program code recorded in recording media, such as CD-ROMs and DVDs, may be installed and executed in a computer, or may be directly read and executed by a computer through the recording media loaded in the computer. Then, functional blocks similar to those formed of the operation-information analyzer 110, the aimed-target determining unit 120, the hitting determining unit 130, the gauge controller 140, the game-result determining unit 150, the image controller 160, and the sound controller 170 shown in FIG. 3, may be formed In the computer. It is thus possible to execute a game similar to that of the aforementioned embodiment.

In this case, it is not necessary to form the above-described functional blocks only by the code recorded in the recording media, and the program code may cooperate with an operating system (OS) within the computer or with another application to form the functional blocks.

As is seen from the foregoing description, according to the target-game execution method of the present invention, highly entertaining target games can be executed on game machines, and such game machines can be differentiated from other types of game machines and are thus very desirable. This target-game execution method can be implemented by simple rules and are thus executable on portable game machines having high restrictions imposed on storage units. Additionally, by reading computer-readable program code recorded on recording media, this game execution method can be executed on general-purpose computers and home-use game machines.

What is claimed is:

1. A target-game execution method for use in a portable game machine which comprises input means operated by a game player, game processing means for executing game processing based on an operation input from said input means, and display means for providing an execution result executed by said game processing means to the game player, said target-game execution method comprising the steps of:

displaying a plurality of targets on said display means;

determining by said game processing means by using first pitching data and second pitching data successively input by the game player through said input means whether a ball has hit one of the plurality of targets, one of the first pitching data and the second pitching data being used as information concerning a vertical displacement of the ball from an aimed target, and the other data being used as information concerning a horizontal displacement of the ball from the aimed target; and displaying a resulting image of the target on said display means after the ball has been thrown based on a determination result obtained by said game processing means.

2. A target-game execution method according to claim 1, wherein pitch-correcting data input by the game player through said input means for correcting at least one of the first pitching data and the second pitching data is received, and based on at least one of the first pitching data and the second pitching data corrected with the pitch-correcting data, said game processing means determines whether the ball has hit one of the plurality of targets.

3. A target-game execution method according to claim 2, further including the step of providing a plurality of gauges to input the first pitching data, the second pitching data and the pitch-correcting data, respectively.

4. A target-game execution method according to claim 1, wherein the plurality of targets are sequentially located in a matrix form.

5. A target-game execution method according to claim 4, wherein, when the ball has been displaced from the aimed target in one of the vertical direction and the horizontal direction and when there is a remaining target which has not been hit at a position to which the ball has been displaced, said game processing means determines that the ball has hit the remaining target.

6. A target-game execution method according to claim 5, wherein, when the ball has been displaced from the aimed target in one of the vertical direction and the horizontal direction and when there is a target which has not been hit adjacent to the aimed target in the direction to which the ball has been displaced, said game processing means determines that the ball has hit some of the plurality of targets located in the direction to which the ball has been displaced.

7. A target-game execution method according to claim 6, further comprising the steps of:

locating a gauge, which is formed by continuously arranging a plurality of small regions in a predetermined direction, at a predetermined position of said display means; and displaying timing information on said gauge as a guide for the game player for inputting the first pitching data, the second pitching data, and the pitch-correcting data.

8. A target-game execution method according to claim 7, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

9. A target-game execution method according to claim 5, further comprising the steps of:

locating a gauge, which is formed by continuously arranging a plurality of small regions in a predetermined direction, at a predetermined position of said display means; and displaying timing information on said gauge as a guide for the game player for inputting the first pitching data, the second pitching data, and the pitch-correcting data.

10. A target-game execution method according to claim 9, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

11. A target-game execution method according to claim 5, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

12. A target-game execution method according to claim 6, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

13. A target-game execution method according to claim 4, wherein, when the ball has been displaced from the aimed target in one of the vertical direction and the horizontal direction and when there is a target which has not been hit adjacent to the aimed target in the direction to which the ball has been displaced, said game processing means determines that the ball has hit some of the plurality of targets located in the direction to which the ball has been displaced.

14. A target-game execution method according to claim 13, further comprising the steps of:

locating a gauge, which is formed by continuously arranging a plurality of small regions in a predetermined direction, at a predetermined position of said display means; and displaying timing information on said gauge as a guide for the game player for inputting the first pitching data, the second pitching data, and the pitch-correcting data.

15. A target-game execution method according to claim 14, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

16. A target-game execution method according to claim 13, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

17. A target-game execution method according to claim 4, further comprising the steps of:

locating a gauge, which is formed by continuously arranging a plurality of small regions in a predetermined direction, at a predetermined position of said display means; and displaying timing information on said gauge as a guide for the game player for inputting the first pitching data, the second pitching data, and the pitch-correcting data.

18. A target-game execution method according to claim 17, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

19. A target-game execution method according to claim 4, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

20. A target-game execution method according to one claim 1, wherein, when the ball has been displaced from the aimed target in one of the vertical direction and the horizontal direction and when there is a remaining target which has not been hit at a position to which the ball has been displaced, said game processing means determines that the ball has hit the remaining target.

21. A target-game execution method according to claim 20, wherein, when the ball has been displaced from the aimed target in one of the vertical direction and the horizontal direction and when there is a target which has not been hit adjacent to the aimed target in the direction to which the ball has been displaced, said game processing means determines that the ball has hit some of the plurality of targets located in the direction to which the ball has been displaced.

22. A target-game execution method according to claim 21, further comprising the steps of:

locating a gauge, which is formed by continuously arranging a plurality of small regions in a predetermined direction, at a predetermined position of said display means; and displaying timing information on said gauge as a guide for the game player for inputting the first pitching data, the second pitching data, and the pitch-correcting data.

23. A target-game execution method according to claim 22, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

24. A target-game execution method according to claim 21, further comprising the steps of:

determining by said game processing means that the game is a success when all the targets have been hit within a predetermined limited number of balls, and determining that the game is a failure when not all the targets have been hit within the predetermined limited number of balls; and displaying an image representing the success of the game on said display means when the game is found to be a success.

25. A target-game execution method according to claim 20, further comprising the steps of:

locating a gauge, which is formed by continuously arranging a plurality of small regions in a predetermined direction, at a predetermined position of said display means; and displaying timing information on said gauge as a guide for the game player for inputting the first pitching data, the second pitching data, and the pitch-correcting data.

26. A target-game execution method according to claim 25, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

27. A target-game execution method according to claim 20, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

28. A target-game execution method according to claim 1, wherein, when the ball has been displaced from the aimed target in one of the vertical direction and the horizontal direction and when there is a target which has not been hit adjacent to the aimed target in the direction to which the ball has been displaced, said game processing means determines that the ball has hit some of the plurality of targets located in the direction to which the ball has been displaced.

29. A target-game execution method according to claim 28, further comprising the steps of:

locating a gauge, which is formed by continuously arranging a plurality of small regions in a predetermined direction, at a predetermined position of said display means; and displaying timing information on said gauge as a guide for the game player for inputting the first pitching data, the second pitching data, and the pitch-correcting data.

30. A target-game execution method according to claim 29, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

31. A target-game execution method according to claim 28, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

32. A target-game execution method according to claims 1, further comprising the steps of:

locating a gauge, which is formed by continuously arranging a plurality of small regions in a predetermined direction, at a predetermined position of said display means; and displaying timing information on said gauge as a guide for the game player for inputting the first pitching data, the second pitching data, and the pitch-correcting data.

33. A target-game execution method according to claim 32, further comprising the steps of:

determining by said game processing means that the game is a success when all the targets have been hit within a predetermined limited number of balls, and determining that the game is a failure when all the targets have not been hit within the predetermined limited number of balls; and displaying an image of the success of the game on said display means when the game is found to be a success.

34. A target-game execution method according to one of 1 and 2, further comprising the steps of:

determining by said game processing means success when all the targets have been hit within a predetermined limited number of balls, and determining that the game is a failure when all the targets have not been hit within the predetermined limited number of balls; and displaying an image of the success of the game on said display means when the game is found to be a success.

35. A game machine comprising:

input means operated by a game player;

game processing means for executing game processing based on an operation input from said input means; and display means for providing an execution result executed by said game processing means to the game player, wherein said game processing means displays a plurality of targets on said display means and determines by using first pitching data and second pitching data successively input by the game player through said input means whether a ball has hit one of the plurality of targets, one of the first pitching data and the-second pitching data being used as information concerning a vertical displacement of the ball from an aimed target, and the other data being used as information concerning a horizontal displacement of the ball from the aimed target, and said game processing means displays a resulting image of the target on said display means after the ball has been thrown based on a determination result obtained by said game processing means.

36. A game machine according to claim 35, wherein said input means, said game processing means, and said display means are contained in a portable housing.

37. A computer-readable recording medium in which program code for operating a computer as a game machine is recorded, said computer including predetermined display means and input means operated by a game player, said program code causing said computer to execute the steps comprising:

displaying a plurality of targets on said display means;

determining by using first pitching data and second pitching data successively input by the game player through said input means whether a ball has hit one of the plurality of targets, one of the first pitching data and the second pitching data being used as information concerning a vertical displacement of the ball from an aimed target, and the other data being used as information concerning a horizontal displacement of the ball from the aimed target; and displaying a resulting image of the target on said display means after the ball has been thrown based on the determination result.

38. A target-game execution method for use in a portable game machine which comprises input means operated by a game player, game processing means for executing game processing based on an operation input from said input means, and display means for providing an execution result executed by said game processing means to the game player, said target-game execution method comprising the steps of:

displaying a plurality of targets on said display means wherein the plurality of targets are sequentially located in a matrix form;

determining by said game processing means by using first pitching data and second pitching data successively input by the game player through said input means whether a ball has hit one of the plurality of targets, one of the first pitching data and the second pitching data being used as information concerning a vertical displacement of the ball from an aimed target, and the other data being used as information concerning a horizontal displacement of the ball from the aimed target; and displaying a resulting image of the target on said display means after the ball has been thrown based on a determination result obtained by said game processing means wherein, when the ball has been displaced from the aimed target in one of the vertical direction and the horizontal direction and when there is a remaining target which has not been hit at a position to which the ball has been displaced, said game processing means determines that the ball has hit the remaining target.

39. A target-game execution method for use in a portable game machine which comprises input means operated by a game player, game processing means for executing game processing based on an operation input from said input means, and display means for providing an execution result executed by said game processing means to the game player, said target-game execution method comprising the steps of:

displaying a plurality of targets on said display means wherein the plurality of targets are sequentially located in a matrix form;

determining by said game processing means by using first pitching data and second pitching data successively input by the game player through said input means whether a ball has hit one of the plurality of targets, one of the first pitching data and the second pitching data being used as information concerning a vertical displacement of the ball from an aimed target, and the other data being used as information concerning a horizontal displacement of the ball from the aimed target wherein pitch-correcting data input by the game player through said input means for correcting at least one of the first pitching data and the second pitching data is received, and based on at least one of the first pitching data and the second pitching data corrected with the pitch-correcting data, said game processing means determines whether the ball has hit one of the plurality of targets; and displaying a resulting image of the target on said display means after the ball has been thrown based on a determination result obtained by said game processing means.

40. A target-game execution method for use in a portable game machine which comprises input means operated by a game player, game processing means for executing game processing based on an operation input from said input means, and display means for providing an execution result executed by said game processing means to the game player, said target-game execution method comprising the steps of:

displaying a plurality of targets on said display means wherein the plurality of targets are sequentially located in a matrix form;

determining by said game processing means by using first pitching data and second pitching data successively input by the game player through said input means whether a ball has hit one of the plurality of targets, one of the first pitching data and the second pitching data being used as information concerning a vertical displacement of the ball from an aimed target, and the other data being used as information concerning a horizontal displacement of the ball from the aimed target wherein pitch-correcting data input by the game player through said input means for correcting at least one of the first pitching data and the second pitching data is received, and based on at least one of the first pitching data and the second pitching data corrected with the pitch-correcting data, said game processing means determines whether the ball has hit one of the plurality of targets; and displaying a resulting image of the target on said display means after the ball has been thrown based on a determination result obtained by said game processing means wherein when the ball has been displaced from the aimed target in one of the vertical direction and the horizontal direction and when there is a remaining target which has not been hit at a position to which the ball has been displaced, said game processing means determines that the ball has hit the remaining target.

* * * * *